(12) United States Patent
Smidth et al.

(10) Patent No.: US 9,380,546 B1
(45) Date of Patent: Jun. 28, 2016

(54) DATA COMMUNICATION OVER A FRAME SYNCHRONIZED DIGITAL TRANSMISSION NETWORK

(71) Applicant: Exalt Communications Incorporated, Campbell, CA (US)

(72) Inventors: Peter Smidth, San Luis Obispo, CA (US); Venkateswara Rao Sattiraju, Union City, CA (US); Yongmin Zhang, San Jose, CA (US); Jean-Laurent Plateau, San Jose, CA (US)

(73) Assignee: Exalt Wireless, Inc., Campbell, CA (US)

( * ) Notice: Subject to any disclaimer, the term of this patent is extended or adjusted under 35 U.S.C. 154(b) by 245 days.

(21) Appl. No.: 14/109,758

(22) Filed: Dec. 17, 2013

Related U.S. Application Data

(60) Provisional application No. 61/738,339, filed on Dec. 17, 2012.

(51) Int. Cl.
*G01R 31/08* (2006.01)
*H04W 56/00* (2009.01)
*H04W 24/00* (2009.01)

(52) U.S. Cl.
CPC ............ *H04W 56/001* (2013.01); *H04W 24/00* (2013.01)

(58) Field of Classification Search
CPC ....................................................... H04L 27/30

USPC .................................................. 370/230–330
See application file for complete search history.

(56) References Cited

U.S. PATENT DOCUMENTS

| | | | | | |
|---|---|---|---|---|---|
| 2008/0310487 | A1* | 12/2008 | Hammerschmidt | . | H04B 7/0413 375/219 |
| 2013/0259101 | A1* | 10/2013 | Earnshaw | ................ | H04B 3/32 375/219 |
| 2014/0146732 | A1* | 5/2014 | Olufunmilola | ....... | H04W 24/10 370/311 |

* cited by examiner

*Primary Examiner* — Iqbal Zaidi
(74) *Attorney, Agent, or Firm* — Hickman Palermo Becker Bingham LLP

(57) ABSTRACT

Techniques for minimizing latency and latency jitter in communication transmission systems are provided. In some embodiments, a first communication transmission system in a chain is configured to operate in accordance with a particular signal processing mode. Operating in accordance with the particular signal processing mode causes user data received in a first wireless signal to bypass a first set of one or more processing modules in an upstream receiver and a second set of one or more processing modules in a downstream transmitter. After the user data has bypassed the first and second set of processing modules, a second wireless signal that includes the user data is transmitted to a third communication transmission system in the chain. In other embodiments, the signal processing mode may be adaptively changed based on one or more conditions that are monitored along the chain.

20 Claims, 10 Drawing Sheets

DATA COMMUNICATION OVER A FRAME SYNCHRONIZED DIGITAL TRANSMISSION NETWORK

CLAIM OF PRIORITY

The present application claims domestic priority under 35 U.S.C. §119 to U.S. Provisional Patent Application Ser. No. 61/738,339, titled "METHOD OF DATA COMMUNICATION OVER A FRAME SYNCHRONIZED DIGITAL TRANSMISSION NETWORK FOR LOW LATENCY AND LOW JITTER ADAPTIVE LATENCY CONTROL MECHANISM," filed on Dec. 17, 2012.

FIELD OF THE DISCLOSURE

The present disclosure relates to data communication and, more specifically, to techniques for reducing latency and latency jitter in communication transmission systems.

BACKGROUND

A digital transmission system typically encapsulates user traffic into frames with overhead for synchronization, system management and other purposes. When the overhead data is transmitted, user traffic has to be put into a buffer and wait for the next available time slot for transmission. Thus, latency and latency jitter may be introduced. In addition, in some transmission systems such as digital microwave radios, user data typically is transformed in the interface from one transmission form and protocol to another, put into some kind of frames, combined with redundancy for error detection and/or correction, and modulated into a waveform for transmission. Each of these processes introduces delay.

Other sources of latency and latency jitter to user data include line interface data buffering, error correction encoding/decoding, data framing and overhead insertion. When the user data goes through a series of digital transmission systems, this additional latency will not only accumulate, its variance or jitter may also spread into a wider range. For some data transmission applications, minimum latency and latency jitter is critical.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
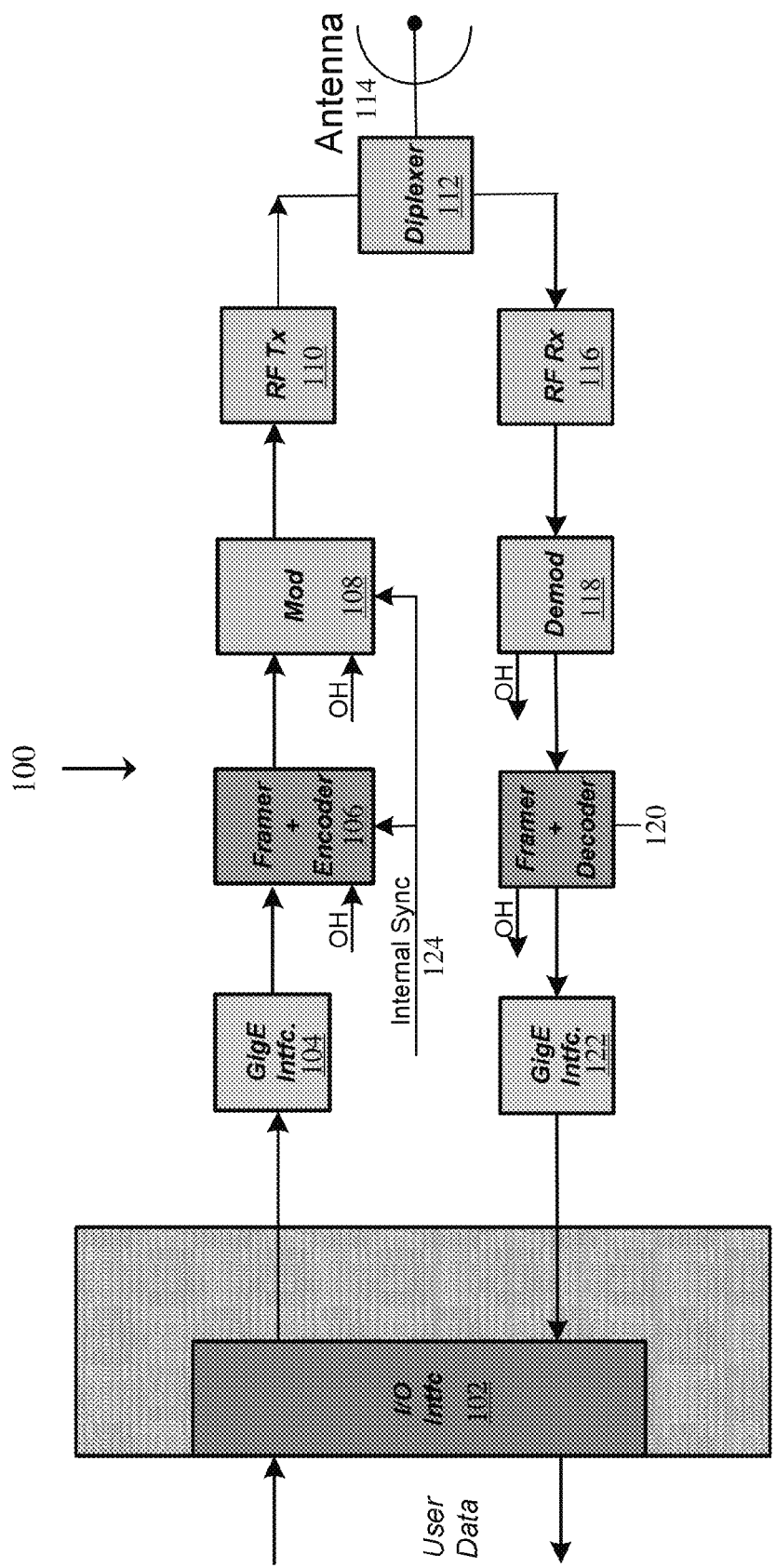
FIG. 1 is a block diagram that depicts an example architecture of a digital microwave device that includes signal processing modules for transmitting and recovering user data, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for minimizing accumulated latency and latency jitter in communication transmission systems. In some embodiments, latency is reduced by staggered alignment of frame timing of multiple systems in a chain of communication transmission systems. Within the chain, synchronization signals are sent from upstream receivers to downstream transmitters. Each downstream transmitter may adjust the timing of transmission of radio frames such that data sent in the radio frame has the same position as in a radio frame received by the upstream receiver. Using this process, the whole chain of a radio network may be frame staggered aligned in each direction. With frame staggered alignment, user data does not need to wait for the start of a new radio frame at each hop along the chain, since new radio frames may be transmitted as the user data arrives. Thus, synchronizing the whole chain of a radio network may significantly reduce or eliminate latency due to buffering user traffic.

In other embodiments, communication transmission systems in a chain of communication transmission systems may operate in accordance with different signal processing modes. Various data and signal processing modules (collectively referred to herein as "signal processing modules") may be bypassed depending on the mode of operation for each communication transmission system in the chain. As each signal processing module may introduce latency and latency jitter, minimizing the number of modules used in a chain of communication transmission systems may significantly decrease the time for user data to traverse the whole chain of a radio network.

In other embodiments, communication channel conditions are monitored in order to adaptively switch between modes of operation, enabling adaptive latency control. When a quality associated with a wireless signal is strong between an upstream transmitter and a downstream receiver, certain signal processing modules may be disabled with little risk of data corruption. Accordingly, the downstream communication transmission system including the receiver may operate in a low-latency mode where such signal processing modules are bypassed. If the conditions indicate that the quality associated with the wireless signal is deteriorating, then one or more signal processing modules may be adaptively enabled to reduce the risk of data corruption. Similarly, the one or more signal processing modules may be adaptively enabled as the quality associated with the wireless signal becomes stronger.

In other embodiments, the conditions monitored by one communication transmission system in a chain may affect the operating mode of a different communication transmission system in the chain. If the conditions monitored by the communication transmission system indicate that the quality of the communications channel is changing, then the communication transmission system may notify an upstream or downstream communication transmission system in the chain. In response, the upstream or downstream communication transmission system may adaptively enable or disable one or more signal processing modules.

Communication Transmission Systems

A communication transmission system is a system that transmits signals carrying data from one location to another. Some examples provided below describe the process for reducing latency with respect to digital microwave radios. However, the embodiments are not limited to digital microwave radios and may be applied to other communication transmission systems as well. Example communication transmission systems may include, without limitation, wired, optical fiber, and wireless transmission media or some combination thereof. Wireless transmission systems may communicate via microwaves, radio waves, or some other form of electromagnetic radiation. As used herein, a communication transmission system may refer to a single device or a plurality of devices for transmitting a signal.

FIG. 1 is a block diagram that depicts an example architecture of a digital microwave radio device that includes signal processing modules for transmitting and recovering user data, according to an embodiment. Digital microwave radio 100 generally comprises input/output (I/O) interface 102, gigabit Ethernet interface 104, framer and encoder 106, modulator 108, radio frequency (RF) transmitter 110, diplexer 112, antenna 114, RF receiver 116, demodulator 118, framer and decoder 120, and gigabit Ethernet interface 122.

User data is input to digital microwave radio 100 through I/O interface 102. In response, I/O interface 102 provides the user data to gigabit Ethernet interface 104, which generate Ethernet data packets in accordance with the Ethernet standards. For example, gigabit Ethernet interface 104 may divide a stream of user data into a set of Ethernet frames. Generating Ethernet frames may comprise inserting overhead data in the user data. Example Ethernet frame overhead data may include, without limitation a preamble, a start frame delimiter, and/or an Ethernet header.

Once processed by gigabit Ethernet interface 104, the user data is further processed by framer and encoder 106 and modulator 108. These signal processing modules may add radio overhead data (OH) to the user data. Radio overhead data may comprise data used to synchronize a far-end receiver with the transmitter, data to manage radios remotely, etc. For example, framer and encoder 106 may insert the Ethernet frames into a set of radio frames which are periodically generated and transmitted according to internal sync signal 124. Framer and encoder 106 may also add error correction data and/or other data not used for synchronizing a far-end receiver with a transmitter. Example error correction data that may be added may include, without limitation, a checksum, a cyclic redundancy check (CRC), a forward error correction (FEC) code, and/or other error correction (ECC) codes. Framer and encoder 106 outputs the user and overhead data to modulator 108 as radio symbols.

Modulator 108 performs modulation of an internal sync signal 124 (the carrier wave) based on the radio symbols received from framer and encoder 106. For example, internal sync signal 124 may be varied based on a discrete set of radio symbols, where each symbol corresponds to a different state of the carrier wave (e.g., a different amplitude, frequency, phase, or some combination thereof) and represents n bits of data, where n is a positive integer.

RF transmitter 110 generates an RF signal based on the modulated signal received from modulator 108. The RF signal passes through diplexer 112 and is applied to antenna 114 to generate radio waves and wirelessly propagate the signal to a receiver.

Signals received by antenna 114 undergo a series of inverse processes to recover user data. When a radio signal is intercepted by antenna 114, the signal passes through diplexer 112 to RF receiver 116. RF receiver 116 downconverts the radio signal so that it may be processed by demodulator 118. The signal is next demodulated by demodulator 118 to recover the radio symbols from a modulated carrier wave. The demodulated signal is provided to framer and decoder 120, which converts the radio symbols to bytes, removes the radio frame overhead data, and performs error correction for data included in the radio frame. Error correction may include, without limitation, decoding an error correction code such as an FEC code and CRC to determine whether data has been corrupted and to perform forward error correction. Once the radio frame overhead data has been removed, gigabit Ethernet interface 122 removes the Ethernet overhead data to recover the user data, which is provided to user equipment through I/O interface 102.

Communication System Chain

Figure 2:
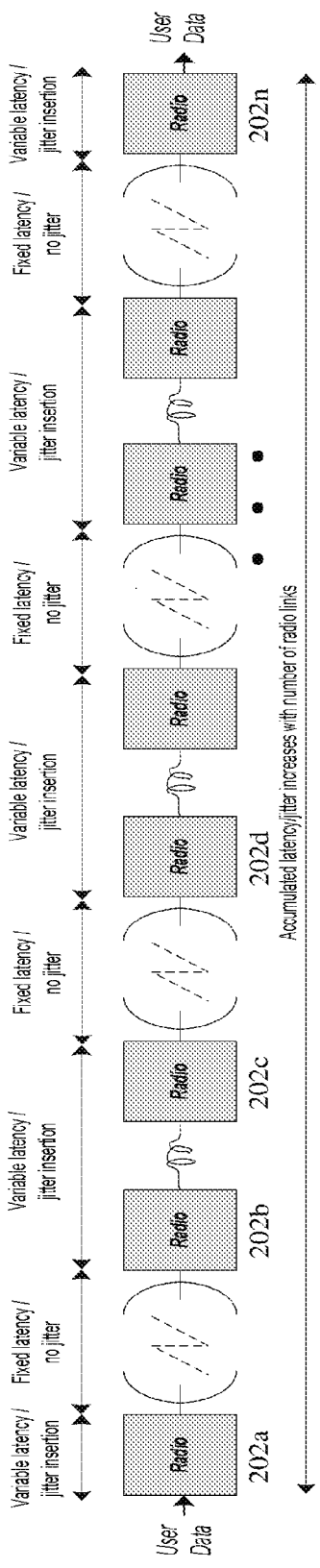
FIG. 2 is a block diagram that depicts a chain of communication transmission systems for transmitting user data from a source communication transmission system to a destination communication transmission system, according to an embodiment.
Figure 2:
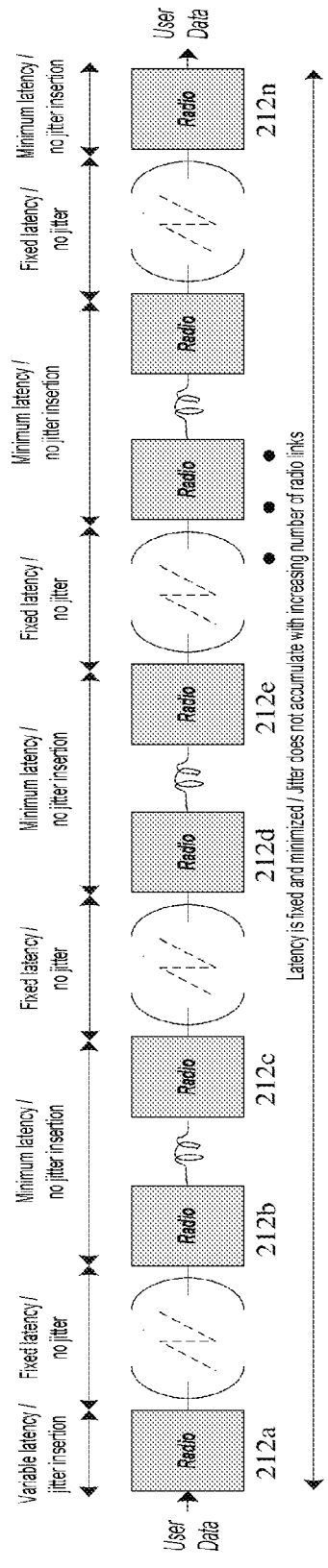

A pair of digital microwave radio devices or other communication transmission devices may be used to form a wireless link to pass user data from one end to another. The wireless links may be cascaded in a chain to form a route to cover a long distance. For example, FIG. 2 is a block diagram that depicts a chain of communication transmission systems for transmitting user data from a source communication transmission system to a destination communication transmission system. In traditional wireless link 200 user data is input into radio 202a (the source communication transmission system). Radio 202a sends a wireless signal including the user data to radio 202b, which processes the signal (e.g., using an RF receiver, demodulator, framer and decoder, and gigabit Ethernet interface) to recover the user data. Once recovered, the user data is sent via cable to radio 202c, which generates a wireless signal (e.g., using a gigabit Ethernet interface, framer and encoder, modulator, and RF transmitter) to propagate the signal to radio 202d. This process is repeated for each hop along the chain until the user data reaches and is recovered by radio 202n.

With traditional wireless link 200, each hop includes two radio devices: one for receiving a wireless signal from an upstream transmitter and one for transmitting a wireless signal to a downstream receiver. The generation of radio frames by the downstream transmitter is independent of the upstream receiver. For example, radio 202c may generate radio frames based on its own internal sync signal, independent of radio 202b. Thus, as user data is received by radio 202c from radio 202b, radio 202c may be in the middle of transmitting a frame. Accordingly, data may need to be buffered, which introduces latency and latency jitter. In addition, the amount of latency and latency jitter increase with the number of radio links between the source and destination.

Wireless link with frame synchronization 210 minimizes latency and latency jitter by using frame staggered alignment. According to this technique, the downstream transmitter generates and transmits radio frames based on the timing and rate at which radio frames are received by an upstream receiver. For example, radio 212b receives a wireless signal including radio frames from radio 212a. Based on the arrival rate of the radio frames, radio 202c synchronizes with radio 202b. Similarly, radio 202e may synchronize with radio 202d, etc. Accordingly, the arrival and transmission times of radio frames are synchronized at each hop along the chain, resulting in the entire chain being synchronized. This allows the user data to be placed in the same position of each radio frame without introducing delay. Frame staggered alignment is described in further detail below.

Signal Processing, Latency, and Latency Jitter

The definition of latency may vary between various applications. Radio latency may be defined as the time delay between when user data is completely input in a radio device at a source and when the user data is completely output by a radio device at a destination, excluding time needed to propagate a radio signal in the air or other media. Thus, signal processing modules that buffer data in order to insert overhead data and/or perform other signal/data processing introduces latency. For long distance applications that involve many radio links in a chain, both latency and latency jitter accumulate as user data are moving along from one end to the other.

Figure 3:
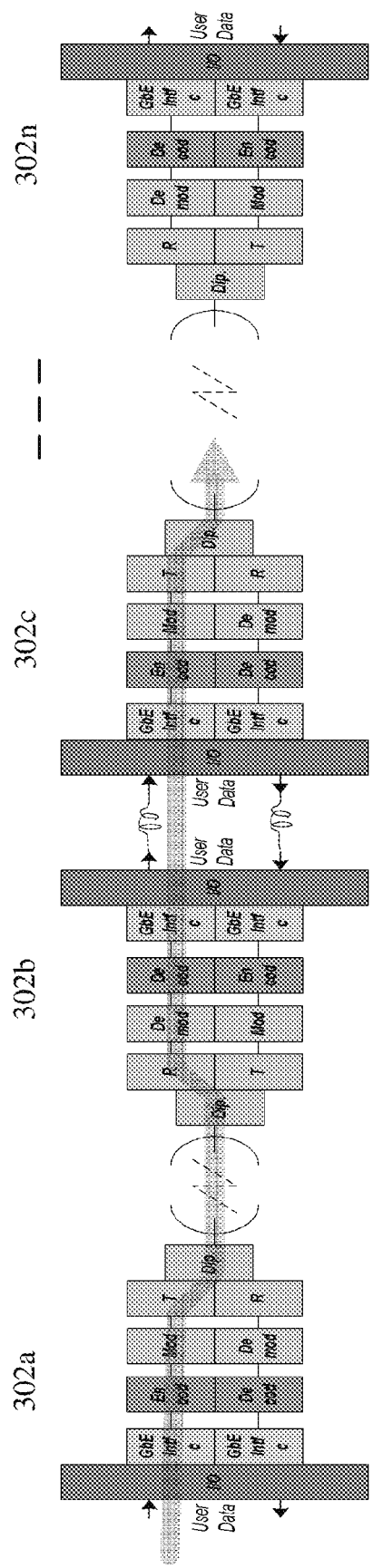
FIG. 3 is a block diagram depicting an example route through a chain of digital microwave radios, according to an embodiment.

FIG. 3 is a block diagram depicting an example route for transmitting user data, according to an embodiment. The route is a chain of N microwave radios (radios 302a to 302n) where N is a positive integer, radio 302a is the first radio (the source), and radio 302n is the $N^{th}$ radio (the destination). Radios 302a and 302b are a pair linked over the air by microwave (or other wireless) signals transmitting and receiving through antenna. Radio 302c may be co-located with radio 302b at the same site. In addition or alternatively, radios 302b and 302c may be connected by cables. Radio 302c may form a microwave (or other wireless) link with a fourth radio (not depicted). Similarly radio N-1 and radio N-2 may be co-located at the same site and/or connected by cables. Radio N-1 forms a wireless link with radio 302n to complete the chain.

User data is input at radio 302a and is processed by a gigabit Ethernet module, a framer and encoding module, and a modulator before transmission to radio 302b. Radio 302b recovers the user data by processing the wireless signal received from radio 302a using a demodulator, a framer and decoding module, and a gigabit Ethernet interface. Once the overhead data has been processed/stripped and the user data recovered, radio 302b sends the user data to radio 302c. In response to receiving the user data, radio 302c performs the same set of processes as radio 302a—encapsulating the data into Ethernet frames using a gigabit Ethernet module, placing the data into radio frames with error detection data using a framer and encoder, and modulating the signal using a modulator—before transmitting the signal to a next radio in the chain. The next radio recovers the user data according to the same process given for radio 302b, and this process is repeated until the user data reaches its destination at radio 302n.

Each signal processing module on the radio transmission side and radio receiver side may introduce latency. Latency introduced by gigabit Ethernet modules, framer and encoding/decoding modules, and modulators may be significant. For example, it may take multiple radio frame cycles to decode error correction data included in a signal. The user data may also be buffered at each of these modules in order to insert overhead data. If the radio frames are not frame staggered aligned, inserting overhead data may introduce latency jitter in addition to increasing latency.

Figure 4:
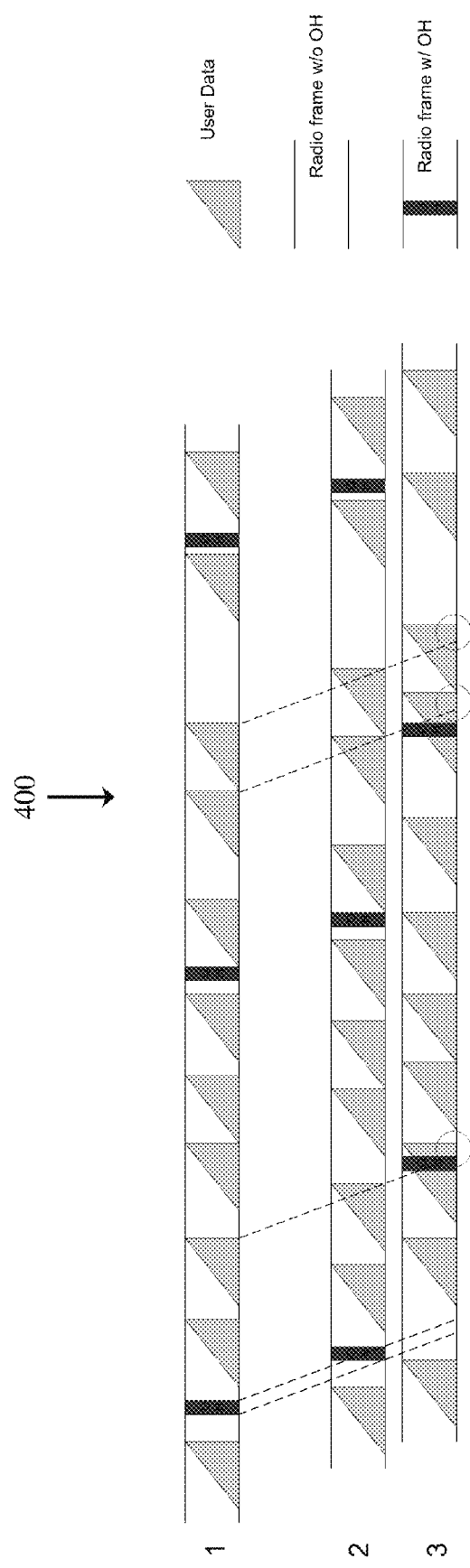
FIG. 4 is a timing diagram depicting example latency and latency jitter introduced by inserting overhead data, according to an embodiment.

FIG. 4 is a timing diagram depicting example latency and latency jitter introduced by inserting overhead data, according to an embodiment. Timing diagram 400 assumes user data started at radio 302a and the destination is radio 302n. At radio 302a, user data are put into radio frames and transmitted. At radio 302b, the receiver receives the framed data from radio 302a with some delay. The receiver on radio 302b is synchronized with the transmitter of radio 302a in order to recover user data. The received data at radio 302b is then sent to radio 302c through cables to continue the journey. However, radio 302c is working on its own framing independent of radio 302b. When radio 302c is inserting its own overhead data at the beginning of a new radio frame, incoming user data is buffered and delayed, as shown by the circles. The same latency may happen to user data being sent from one radio co-located to another, and this delay may occur somewhat randomly.

Staggered Frame Alignment

In some embodiments, the whole chain of a radio network, from radio 302a to radio 302n, may be frame staggered aligned in each direction. Frame staggered alignment involves synchronizing the transmission of downstream transmitters with upstream receivers at each hop in the chain. When the downstream transmitter is synchronized with the upstream receiver, the downstream transmitter transmits radio frames at the same rate as the upstream receiver receives radio frames, with a slight time delay to account for the delay in moving the user data from the upstream receiver to the downstream transmitter and any latency introduced by signal processing modules. The frame alignment may be performed for each direction of the chain, where frame alignment in each direction is independent of frame alignment in the opposite direction.

In order to synchronize a downstream transmitter with an upstream receiver, synchronization signals may be sent between the devices. For example, radio 302b may send synchronization signals to radio 302c, radio 302d may send synchronization signals to the next radio in the chain, etc., for each hop in the chain with each radio sending synchronization signals to a co-located radio. Synchronization signals have a phase and frequency based on the timing and rate at which radio frames arrive at the upstream receiver. The upstream receiver may determine the timing and rate by detecting radio frame headers at the beginning of each radio frame. In response to receiving the synchronization signals, the downstream transmitter may adjust the phase and/or frequency at which it transmits radio frames until it matches the phase and frequency at which radio frames are received by the upstream receiver, where the phase may be staggered to account for any intervening delay/latency such as latency introduced by signal processing modules. The transmitter may adjust the phase and/or frequency at which it transmits radio frames by adjusting an internal clock (e.g., internal sync signal 124).

Figure 5:
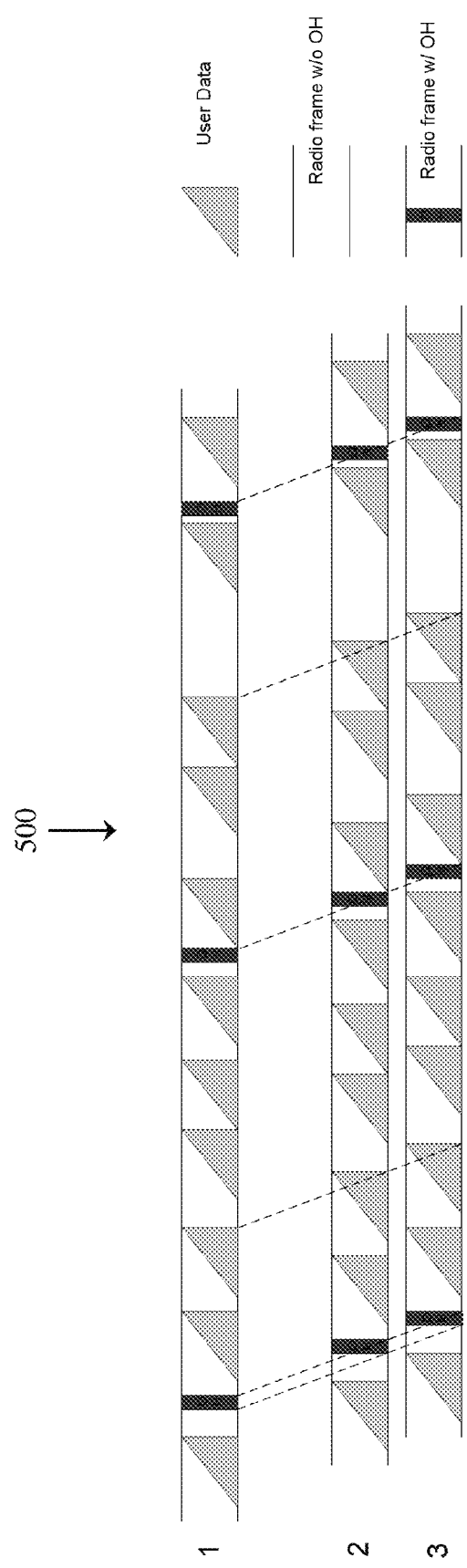
FIG. 5 is a timing diagram depicting example of how latency is minimized and latency jitter is eliminated by frame staggered alignment, according to an embodiment.

FIG. 5 is a timing diagram depicting an example of how latency is minimized and latency jitter is eliminated by frame staggered alignment, according to an embodiment. In timing diagram 500, the transmitter on radio 302*c* aligns its radio frame with that of the receiver of radio 302*b* in such a way that when user data comes to the transmitter of radio 302*c*, the user data will get substantially the same position in a radio frame transmitted by the transmitter as the position that the user data had in the radio frame of the receiver of radio 302*b*. Accordingly, latency and latency jitter introduced to user data due to inserting radio overhead data, as depicted in FIG. 4, may be significantly reduced/eliminated.

Configurable Low-Latency Signal Processing Modes

Communication transmission systems within the chain may be configured to operate in accordance with one of a plurality of low-latency signal processing modes where one or more signal processing modules are bypassed. Bypassing signal processing modules may significantly reduce latency incurred by avoiding time-consuming processing tasks such as encapsulating/unpacking data, framing/recovery, encoding/decoding error data, and modulating/demodulating signals. The signal processing modules that are bypassed may vary from implementation to implementation and may vary between different communication transmission systems in the chain.

Figure 6:
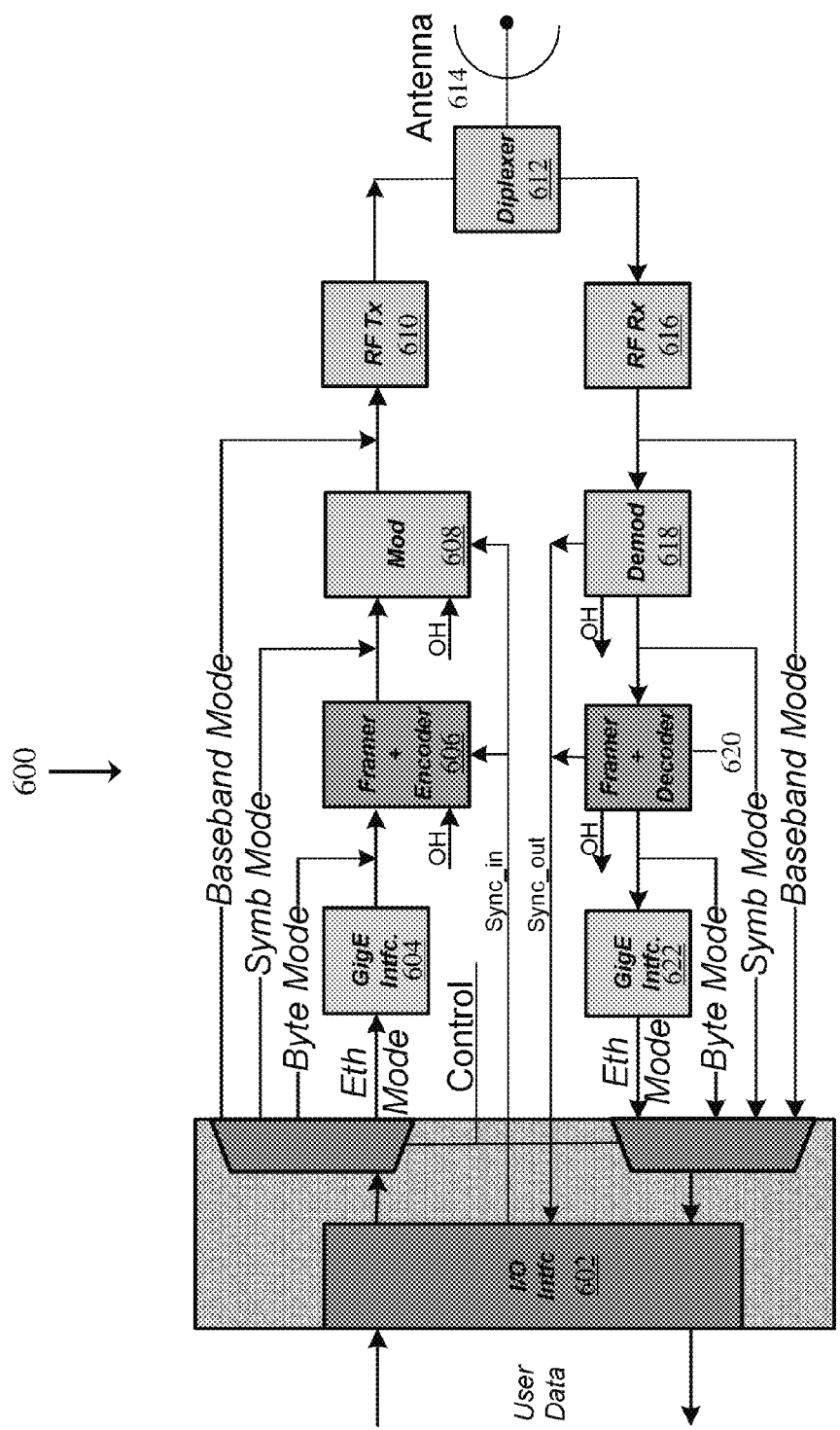
FIG. 6 is a block diagram depicting an example digital microwave radio system with configurable signal processing modes for bypassing signal processing modules, according to an embodiment.

FIG. 6 is a block diagram depicting an example digital microwave radio system with configurable signal processing modes for bypassing signal processing modules, according to an embodiment. Digital microwave radio system 600 includes I/O interface 602, which may be configured as either a standard interface or a special interface. In this example, the standard interface is a gigabit Ethernet interface that connects the radio to customer equipment. In other embodiments, other networking protocols other than Ethernet may be used. When I/O interface 602 is configured as a special interface, it is used to connect two co-located radios with cables in one of three different low-latency signal processing modes: Byte Mode, Symbol Mode, and Baseband Mode. Control signals may be used to select the I/O interface to be in one of the three low-latency signal processing modes or in Ethernet interface mode.

In Ethernet Mode, none of the signal processing modules are bypassed. Thus, user data that is being transmitted is processed by gigabit Ethernet interface 604 to place the user data in Ethernet frames and generate Ethernet data packets. This data is then output to framer and encoder 606, which performs error correction encoding, places the data into radio frames, and converts the data into radio symbols. The radio symbols are sent to modulator 608 to modulate a carrier signal. The signal is converted to a radio frequency by RF transmitter 610 and transmitted downstream through diplexer 612 and antenna 614. For user data that is being received, a series of inverse processes is used to recover the user data. Thus, a wireless signal is received through antenna 614 and receiver 616. The signal is then processed by demodulator 618, framer and decoder 620, and gigabit Ethernet interface 622 to recover user data included in the wireless signal.

In Byte Mode, gigabit Ethernet interface 604 and gigabit Ethernet interface 622 are bypassed by I/O interface 602. To transmit user data, the user data passes from I/O interface 602 directly to framer and encoder 606, bypassing gigabit Ethernet interface 604. Radio symbols generated by framer and encoder 606 are then fed to modulator 608, which uses the radio symbols to modulate an analog signal. RF transmitter 610 converts the modulated signal to an RF signal, which is wirelessly transmitted through antenna 614. Wireless signals received through antenna 614 are processed by RF receiver 616, demodulator 618, and framer and decoder 620. The data output by framer and decoder 620 is sent directly to I/O interface 602, bypassing Ethernet gigabit interface 622. Thus, latency introduced by adding and processing Ethernet overhead data is eliminated for communication transmission systems operating in Byte mode.

In Symbol Mode, gigabit Ethernet interface 604, gigabit Ethernet interface 622, framer and encoder 606, and framer and decoder 620 are bypassed by I/O interface 602. To transmit user data, radio symbols are passed directly from I/O interface 602 to modulator 608. The modulated signal is passed to RF transmitter 610, which transmits a wireless signal including the user data through antenna 614. Inbound wireless signals including user data are processed by RF receiver 616 and demodulator 618. The radio symbols recovered by demodulator 618 are sent directly to I/O interface 602, bypassing framer and decoder 620 and Ethernet gigabit interface 622. Thus, latency introduced by the framer/encoder, framer/decoder and gigabit Ethernet interfaces are eliminated for communication transmission systems operating in Symbol Mode.

In Baseband Mode, gigabit Ethernet interface 604, gigabit Ethernet interface 622, framer and encoder 606, framer and decoder 620, modulator 608, and demodulator 618 are bypassed by I/O interface 602. To transmit user data, a modulated signal is passed directly from I/O interface 602 to RF transmitter 610, which amplifies and sends the modulated signal through antenna 614. Inbound wireless signals including user data are processed by RF receiver 616 to recover a modulated signal. The modulated signal is sent directly to I/O interface 602, bypassing demodulator 618, framer and decoder 620, and Ethernet gigabit interface 622. Thus, latency introduced by a modulator/demodulator, encoder/decoder, and the Ethernet interfaces is eliminated for communication transmission systems operating in Baseband Mode.

In some embodiments, only the source and the destination are configured to operate in Ethernet Mode. For example, I/O interface of radio 302*a* and 302*n* may be set to standard Ethernet mode in order to interface to customer equipment. For all other radios in the chain, their I/O interfaces may be configured in one of the three low-latency signal processing modes.

In some embodiments, co-located radios are configured to have the same I/O interface configuration. Thus, the radios at each hop operate in accordance with the same signal processing mode. However, radios that are not co-located may operate in different operating modes. For example, a chain of communication transmission systems may be configured such that error decoding happens every k hops, where k is a positive integer greater than two. Accordingly, the radio systems at every $k^{th}$ hop may be configured to operate in Byte Mode, where the upstream radio system at the $k^{th}$ hop applies an error correction code to clean up the digital data and the downstream transmitter generates an updated error correction code for the next $k^{th}$ hop (or the destination). The remaining radios are configured to operate in Baseband or Symbol Mode, excluding the source and destination radios, which operate in Ethernet Mode.

Figure 7:
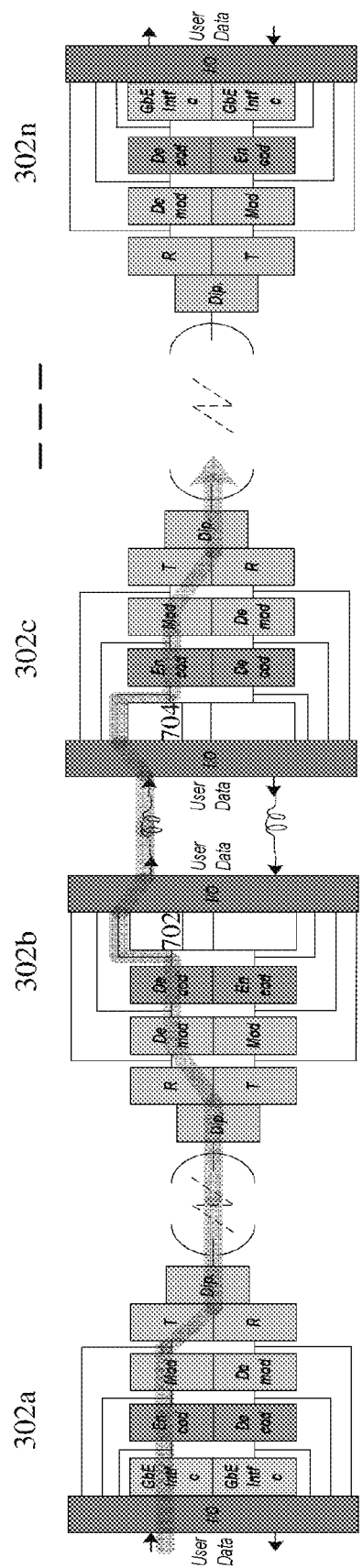
FIG. 7 is a block diagram depicting an example route through a chain of digital microwave radios where a pair of co-located microwave radios are operating in Byte Mode, according to an embodiment.

FIG. 7 is a block diagram depicting an example route through a chain of digital microwave radios where a pair of co-located microwave radios are operating in Byte Mode, according to an embodiment. Referring to FIG. 7, radio 302b and radio 302c are configured to operate in Byte Mode. Radio 302b receives a wireless signal that includes user data from radio 302a. Radio 302b processes the wireless signal using a demodulator and framer/decoder. However, gigabit Ethernet interface 702 is bypassed. Thus, the Ethernet overhead data added by radio 302a is not processed, and radio 302b does not buffer data until an entire Ethernet packet arrives before processing the user data and/or sending the user data to radio 302c. In Byte Mode, user data in their "raw" format (in this example, 8-bit byte format) are sent across the co-located radios, from radio 302b to radio 302c. Radio 302c processes the user data received from radio 302b using a framer/encoder and a modulator, bypassing gigabit Ethernet interface 704. Thus, radio 302c does not add Ethernet overhead data, further reducing latency along the chain.

Figure 8:
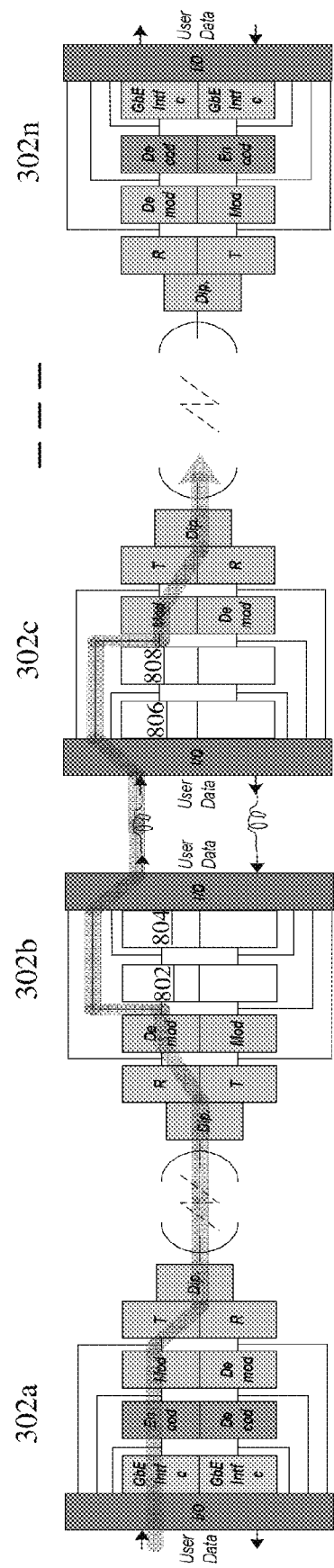
FIG. 8 is a block diagram depicting an example route through a chain of digital microwave radios where a pair of co-located microwave radios are operating in Symbol Mode, according to an embodiment.

FIG. 8 is a block diagram depicting an example route through a chain of digital microwave radios where a pair of co-located microwave radios are operating in Symbol Mode, according to an embodiment. Referring to FIG. 8, radio 302b and radio 302c are configured to operate in Symbol Mode. Radio 302b receives a wireless signal that includes user data from radio 302a. Radio 302b processes the wireless signal using a demodulator. However, framer/decoder 802 and gigabit Ethernet interface 804 are bypassed. Thus, the overhead data added by the radio 302a, such as Ethernet header data and error correction data, is not processed by radio 302b. In Symbol mode, modulated symbols are sent across the co-located radios, from radio 302b to radio 302c, without converting the radio symbols into bytes or other formats. Radio 302c processes the radio symbols received from radio 302b using its modulator, bypassing Ethernet interface 806 and framer/encoder 808. Thus, radio 302c does not incur latency from these bypassed modules (e.g., adding Ethernet overhead data, encoding error correction data, etc.)

Figure 9:
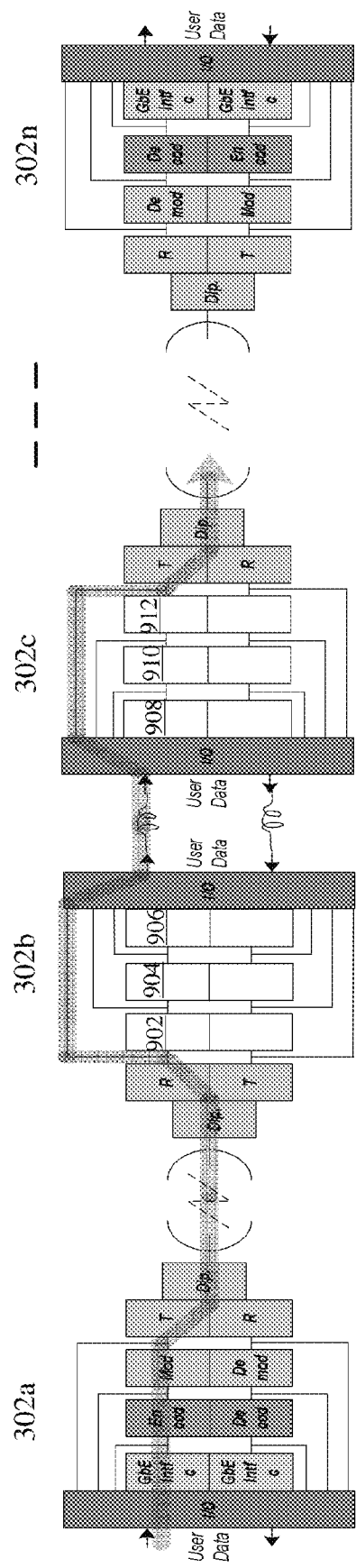
FIG. 9 is a block diagram depicting an example route through a chain of digital microwave radios where a pair of co-located microwave radios are operating in Baseband Mode, according to an embodiment.

FIG. 9 is a block diagram depicting an example route through a chain of digital microwave radios where a pair of co-located microwave radios are operating in Baseband Mode, according to an embodiment. Referring to FIG. 9, radio 302b and radio 302c are configured to operate in Baseband Mode. Radio 302b receives a wireless signal that includes user data from radio 302a. Radio 302b bypasses demodulator 902, framer/decoder 904, and gigabit Ethernet interface 906. Baseband signals are sent across the co-located radios, from radio 302b to radio 302c. Radio 302c amplifies and transmits the baseband signal, bypassing gigabit Ethernet interface 908, framer/encoder 910, and modulator 912. Thus, latency due to these modules is removed.

When the I/O interface is in a low-latency signal processing mode, the interface may pass synchronization information to a co-located radio and/or receive synchronization information from the co-located radio. For example, the upstream receiver may send synchronization signals in addition to raw user data in Byte Mode, radio symbols in Symbol Mode, and baseband signals in Baseband mode. Thus, downstream transmitters may be frame staggered aligned based on synchronization signals received from upstream receivers. This synchronization may happen for both directions in the chain.

Adaptive Latency Control

The mode of operation for each communication transmission system in the chain may be determined based on one or more conditions that are monitored within the communications channel along the chain. The signal processing modes may be selected and adaptively changed to minimize latency while preventing user data from becoming corrupted during transmission.

The conditions that are monitored may vary from implementation to implementation. The conditions may generally comprise any condition that indicates a quality of the communications channels along the chain. Example conditions may include, without limitation, a signal to noise ratio (SNR) between different hops and a bit error rate (BER) for data received in a wireless signal. These conditions may be monitored at each hop along the radio chain.

The BER and/or SNR that is monitored along the radio chain may be used to determine the signal processing mode for radios at a given hop in the transmission chain. For example, when a received radio signal has a good SNR, a digital microwave radio may achieve error-free or low bit error rate. Thus, the error correction coding is either not doing anything or is not helping much at the intermediary hops. In this case, the radios at the hop may be configured to operate in the Symbol or Baseband Mode, and error encoding and decoding modules can be disabled/bypassed in order to reduce latency. However, as user data travels down the radio chain, the BER is going to accumulate. At a certain point, error correction may need to be applied before BER exceeds a certain threshold that may lead to the user data becoming unrecoverable. To prevent such a scenario, radio BER before error correction may be monitored along the radio chain. When BER reaches a pre-determined threshold, error-correction code may be applied to clean up user data. Thus, error correction data generated by one radio system may travel many hops without being processed by radios operating in Baseband or Symbol Mode. Eventually, the data reaches a hop operating in Byte Mode or the destination operating in Ethernet Mode, which cleans up the user data. In this manner, error correction may be applied only when needed and adaptively according to a receiver signal SNR and/or BER.

In another example, when a received radio signal has a good SNR and low interferences, a digital microwave radio RF front-end may have a low noise figure and phase noise. Thus, SNR degradation to the modulated signal is small and tolerable. There is no need of demodulating this received modulated signal, recovering user data back to digital form, and re-modulating again. The received modulated signal can be used directly (e.g., amplified and transmitted), and the corresponding hop may be configured to operate in Baseband Mode. However, as this modulated signal goes down the radio chain, the SNR degradation is going to accumulate. At certain point, this modulated signal may need to be demodulated back to its digital form and be modulated again. Similar to the previous example, SNR and/or radio BER before error correction is monitored along the radio chain. When the SNR and/or BER reaches a pre-determined threshold, modulation and/or error-correction may be applied to clean up user data. Modulation may be used to clean up the analog component of a signal, while error correction may be used to clean up the digital component. Accordingly, modulation/error correction may be applied only when needed and adaptively. This process removes errors from the user data before the process is repeated in subsequent sections of the transmission chain.

Setting and changing the signal processing modes of communication transmission systems may be done automatically or manually, depending on the particular implementation. In the automatic configuration, conditions such as the BER and SNR may be monitored down the radio chain. If the SNR and/or BER for a receiver at a particular hop indicates that the quality associated with the received wireless signal is above a first threshold, then the radios at that hop may be automatically configured to operate in Baseband Mode. If the BER and/or SNR is below the first threshold, but above a second threshold, then the radios at that hop may be configured to operate in Symbol Mode. If the BER and/or SNR is below the first and second threshold, then the radios at the hop may be configured to operate in Byte Mode. With the automatic configuration, control signals may automatically be issued to select and/or switch the signal processing modes based on such predetermined values.

In the manual configuration, the SNR and/or BER may be presented to an end user for each hop along the transmission chain. In addition or alternatively, alerts may be generated to notify the user if the BER and/or SNR has fallen below one or more threshold values. Based on this information, the user may select and/or change the signal processing modes for one or more hops along the chain. For example, the user may view this information through a console application executing on a computer system that is communicatively coupled to each radio system in the chain. In response to a user's request to change the operating mode for a particular hop, the computer system may issue requests according to the simple network management protocol (SNMP) or some other networking protocol. The requests are converted into control signals to configure the I/O interface of the corresponding radio systems.

Passive Monitoring Using Disabled Modules

Although signal modules may be adaptively enabled/disabled according to the techniques described above, in some embodiments, the disabled modules may still be used passively to process data. For example, if a radio 302b is operating in Symbol or Baseband Mode, then the error decoding module is disabled. Even when disabled, however, the module may still decode data to determine a BER associated with the signal received from radio 302a. When disabled, the decoded data is not sent to the next signal processing module (the modulator in the present example). Accordingly, decoding does not cause any additional latency, as the user data that passes through the subsequent signal processing modules and down the transmission chain still bypasses the disabled modules.

The conditions that are passively monitored by disabled modules may be used to detect changes in signal quality and to effect change in a communication transmission system. For instance, environmental factors may cause an increase in the BER and/or SNR of a signal. A disabled decoder may detect that the BER and/or SNR has fallen below a threshold value and, in response, cause the radio system to switch signal processing modes or cause a warning message to be transmitted to a console of an administrator/manager of the communication transmission system. To perform cleanup of the analog signal, the communication transmission system may be switched from Baseband Mode to Symbol Mode. To perform cleanup of the digital component of the signal, the communication transmission system may be switched from Baseband Mode or Symbol mode to Byte Mode. The inverse switch may be performed as the signal quality improves.

Interconnected Chain Management

In some embodiments, the conditions that are monitored at one link in the chain may cause a change in the signal processing mode for communication transmission systems at a different link in the chain. For instance, if a downstream radio receiver detects a deteriorating BER and/or SNR, the signal processing mode for radio systems at an upstream link may be changed to Byte Mode. This enables the decoder/encoder modules causing the upstream link to apply an error correction code to clean-up the data and generate a new error correction code for downstream radio systems.

In other embodiments, changing the signal processing mode at one link may cause another link to change their signal processing mode. For example, a communication transmission system that previously performed error correction may be reconfigured to bypass the error correction modules. This may cause the signal processing modes of one or more downstream communication transmission systems that did not previously perform error correction to be reconfigured such that their decoders/encoders are enabled.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
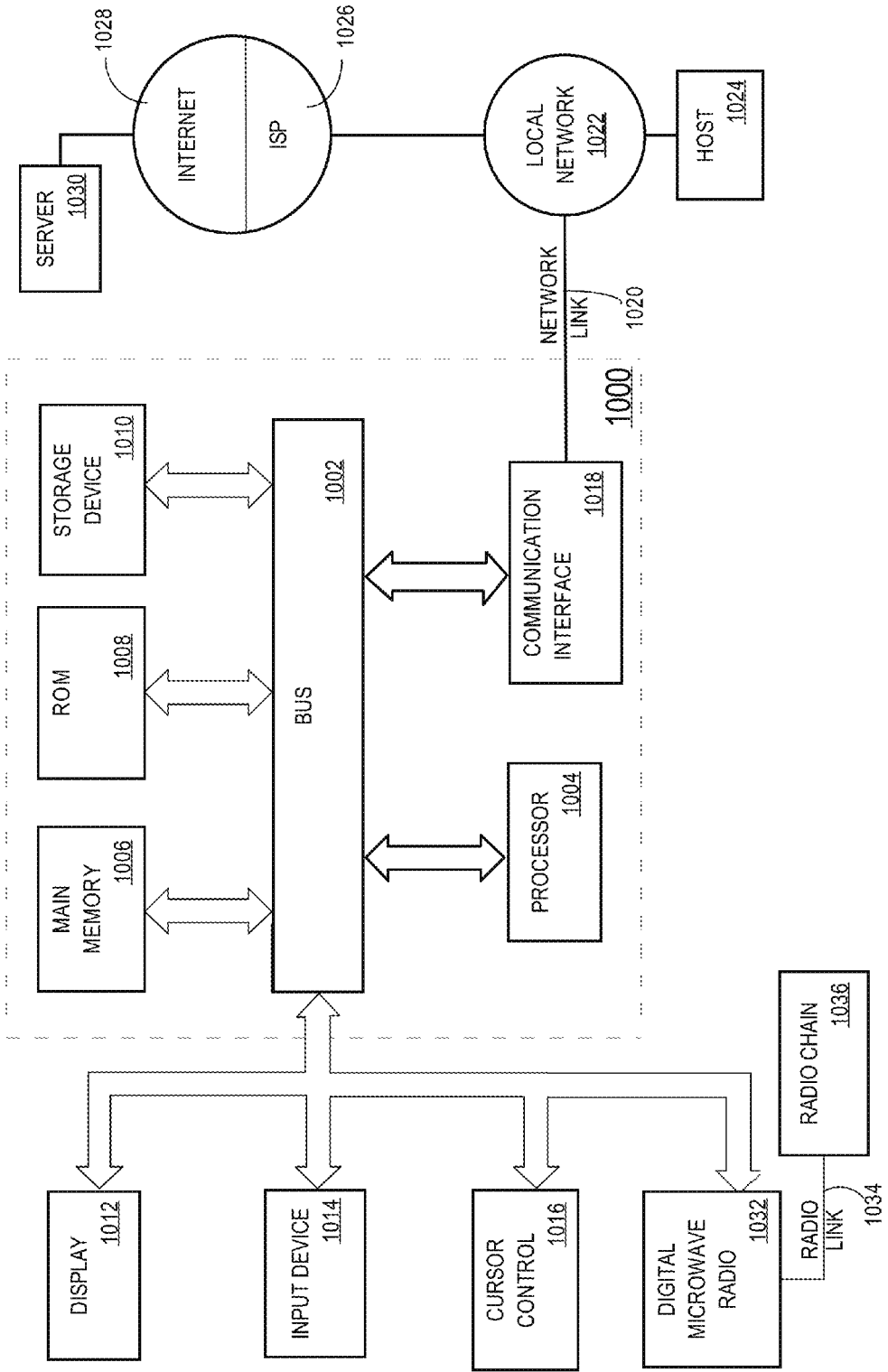
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT) or liquid-crystal display (LCD), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may include and/or be coupled via bus 1002 to a digital microwave radio 1032, such as the digital microwave radios described above, for communicating via radio chain 1036. Digital microwave radio 1032 may receive user data from computer system 1000 for transmission over radio chain 1036 via radio link 1034. Digital microwave radio 1032 may further receive user data from a different system via radio chain 1036 and radio link 1034. Computer system 1000 may configure digital microwave radio 1032 by sending control or other configuration data/signals to digital microwave radio 1032 over bus 1002.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. Server 1030 may interface with a digital microwave radio (not depicted) and configure the digital microwave radio according to the techniques described above.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for adaptively controlling latency comprising:
   monitoring, at a first communication transmission system in a chain of communication transmission systems, one or more conditions associated with a wireless signal received by the first communication transmission system from a second communication transmission system in the chain of communication transmission systems;
   wherein the first communication transmission system is operating according to a first signal processing mode;

based on the one or more conditions associated with the wireless signal received by the first communication transmission system from the second communication transmission system in the chain of transmission systems, causing the first communication transmission system to switch from the first signal processing mode to a second signal processing mode;

wherein the second signal processing mode is different than the first signal processing mode;

wherein switching from the first signal processing mode to the second signal processing mode enables or disables one or more processing modules, in which the first communication transmission system operates, for processing wireless signals received by the first communication transmission system from the second communication transmission system before user data included in the wireless signal is transmitted from the first communication transmission system to a third communication transmission system in the chain of communication transmission systems;

wherein the one or more processing modules are implemented in at least one or more hardware processors.

2. The method of claim 1, wherein the first communication transmission system comprises a first radio device for communicating with the second communication transmission system and a second radio device for communicating with the third communication transmission system;

wherein the wireless signal received by the first communication transmission system from the second communication transmission system in the chain of communication transmission systems includes user data in a first radio frame;

the method further comprising:
while operating in the first signal processing mode, sending synchronization signals from the first radio device to the second radio device such that the user data received by the first device is transmitted by the second radio device to the third communication transmission system in a second radio frame at a substantially same position as the position of the user data in the first radio frame.

3. The method of claim 1, wherein the one or more conditions indicate a quality associated with the wireless signal received by the first communication transmission system from the second communication transmission system;

wherein switching from the first signal processing mode to the second signal processing mode comprises:
if it is determined that the quality associated with the wireless signal is below a threshold, enabling a first processing module that was previously bypassed in the first signal processing mode;
if it is determined that the quality associated with the wireless signal is satisfied, disabling a second processing module that was used in the first signal processing mode such that the second processing module is bypassed when processing the wireless signals received by the first communication transmission system from the second communication transmission system.

4. The method of claim 1, wherein switching from the first signal processing mode to the second signal processing mode comprises:

enabling or disabling a first processing module for processing the wireless signals that include the user data and are received from the second communication transmission system;
enabling or disabling a second processing module, corresponding to the first processing module, for preparing the user data, received in the wireless signals, to be transmitted to the third communication transmission system.

5. The method of claim 1, wherein the first signal processing mode is one of:

a baseband mode that bypasses a first processing module for demodulating wireless signals received by the first communication transmission system and a second processing module for modulating wireless signals transmitted to the third communication transmission system;

a symbol mode that bypasses a third processing module for performing decoding for error correction and a fourth processing module for performing encoding for error correction, wherein the first processing module and the second processing module are not bypassed while operating in symbol mode; or a byte mode that bypasses a fifth processing module for processing Ethernet frames and a sixth processing module for generating Ethernet frames, wherein the first processing module, the second processing module, the third processing module, and the fourth processing module are not bypassed while operating in byte mode;

wherein the second signal processing mode is one of the baseband mode, the symbol mode or the byte mode.

6. The method of claim 5, further comprising:

switching from baseband mode to symbol mode in response to determining that a signal-to-noise ratio or a bit-error ratio is below a first threshold; or switching from symbol mode to byte mode in response to determining that the signal-to-noise ratio or the bit error rate is below a second threshold.

7. The method of claim 1, further comprising:

based on the one or more conditions of the signal received by the first communication transmission system from the second communication transmission system in the chain of transmission systems, switching a signal processing mode of the third communication transmission system.

8. A method for reducing latency when transmitting user data from a source communication transmission system to a destination communication transmission system across a chain of communication transmission systems, the method comprising:

configuring a first communication transmission system in the chain of communication transmission systems to operate in accordance with a first signal processing mode;

wherein the first communication transmission system includes (a) an upstream receiver for receiving first wireless signals from a second communication transmission system in the chain of communication transmission systems and (b) a downstream transmitter for transmitting second wireless signals to a third communication transmission system in the chain of communication transmission systems;

receiving, at the first communication transmission system in the chain of communication transmission systems, a first wireless signal that includes the user data;

operating in accordance with the first signal processing mode by causing the user data to bypass a first set of one or more processing modules in the upstream receiver and a second set of one or more processing modules in the downstream transmitter;

wherein the second set of one or more processing modules that is bypassed in the downstream transmitter is based on the first set of one or more processing modules in the upstream receiver; and after the user data has bypassed the first set of one or more processing modules in the upstream receiver and the second set of one or more processing modules in the downstream transmitter, transmitting a second wireless signal, that includes the user data, to the third communication transmission system in the chain of communication transmission systems;

wherein the first set of one or more processing modules and the second set of one or more processing modules are implemented in at least one or more hardware processors.

9. The method of claim 8, wherein while operating in the first signal processing mode, the upstream receiver sends synchronization signals to the downstream transmitter such that the user data received in a first radio frame by the upstream receiver is transmitted by the downstream transmitter to the third communication transmission system in a second radio frame at a substantially same position as the position of the user data in the first radio frame.

10. The method of claim 8 wherein the first signal processing mode is one of:
 a baseband mode that bypasses a first processing module for demodulating wireless signals received by the first communication transmission system and a second processing module for modulating wireless signals transmitted to the third communication transmission system;
 a symbol mode that bypasses a third processing module for performing decoding for error correction and a fourth processing module for performing encoding for error correction, wherein the first processing module and the second processing module are not bypassed while operating in symbol mode; or
 a byte mode that bypasses a fifth processing module for processing Ethernet frames and a sixth processing module for generating Ethernet frames, wherein the first processing module, the second processing module, the third processing module, and the fourth processing module are not bypassed while operating in byte mode.

11. The method of claim 8,
wherein the first wireless signal includes an error code generated by an encoding module on the second communication transmission system;
wherein operating in accordance with the first signal processing mode comprises causing the user data to bypass a decoder on the first communication transmission system such that the error code is not applied to the user data;
wherein the second wireless signal that is transmitted includes the error code generated by the encoding module on the second transmission system.

12. The method of claim 11, wherein the error code is processed by a fourth communication transmission system that is downstream from the first communication transmission systems in the chain of communication transmission systems.

13. The method of claim 12, the method further comprising:
 monitoring a bit error rate associated with the user data along the chain of communication transmission systems;

wherein the fourth communication transmission system that applies the error code is selected in response to determining that the bit error rate, once the user data has arrived at the fourth communication transmission system, has exceeded a threshold.

14. One or more non-transitory computer-readable media storing instructions for reducing latency when transmitting user data from a source communication transmission system to a destination communication transmission system across a chain of communication transmission systems, the instructions, when executed by one or more processors, causing operations comprising:
 configuring a first communication transmission system in the chain of communication transmission systems to operate in accordance with a first signal processing mode;
 wherein the first communication transmission system includes an upstream receiver for receiving wireless signals from a second communication transmission system in the chain of communication transmission systems and a downstream transmitter for transmitting wireless signals to a third communication transmission system in the chain of communication transmission systems;
 receiving, at the first communication transmission system in the chain of communication transmission systems, a first wireless signal that includes the user data;
 operating in accordance with the first signal processing mode by causing the user data to bypass a first set of one or more processing modules in the upstream receiver and a second set of one or more processing modules in the downstream transmitter;
 wherein the second set of one or more processing modules that is bypassed in the downstream transmitter is based on the first set of one or more processing modules in the upstream receiver; and
 after the user data has bypassed the first set of one or more processing modules in the upstream receiver and the second set of one or more processing modules in the downstream transmitter, transmitting a second wireless signal that includes the user data to the third communication transmission system in the chain of communication transmission systems;
 wherein the one or more processing modules are implemented in at least one or more hardware processors.

15. The one or more non-transitory computer-readable media of claim 14, wherein while operating in the first signal processing mode, the upstream receiver sends synchronization signals to the downstream transmitter such that the user data received in a first radio frame by the upstream receiver is transmitted by the downstream transmitter to the third communication transmission system in a second radio frame at a substantially same position as the position of the user data in the first radio frame.

16. The one or more non-transitory computer-readable media of claim 14, wherein the first signal processing mode is one of:
 a baseband mode that bypasses a first processing module for demodulating wireless signals received by the first communication transmission system and a second processing module for modulating wireless signals transmitted to the third communication transmission system;
 a symbol mode that bypasses a third processing module for performing decoding for error correction and a fourth processing module for performing encoding for error correction, wherein the first processing module and the second processing module are not bypassed while operating in symbol mode; or a byte mode that bypasses a fifth processing module for processing Ethernet frames and a sixth processing module for generating Ethernet frames, wherein the first processing module, the second processing module, the third processing module, and the fourth processing module are not bypassed while operating in byte mode.

17. The one or more non-transitory computer-readable media of claim 14,
- wherein the first wireless signal includes an error code generated by an encoding module on the second communication transmission system;
- wherein instructions for operating in accordance with the first signal processing mode causes the user data to bypass a decoder on the first communication transmission system such that the error code is not applied to the user data;
- wherein the instructions for transmitting the second wireless signal cause the wireless signal to include the error code generated by the encoding module on the second transmission system.

18. The one or more non-transitory computer-readable media of claim 17, wherein the error code is applied by a fourth communication transmission system that is downstream from the first communication transmission systems in the chain of communication transmission systems.

19. The one or more non-transitory computer-readable media of claim 18, the instructions further causing operations comprising:
- monitoring a bit error rate associated with the user data along the chain of communication transmission systems;
- wherein the fourth communication transmission system that applies the error code is selected in response to determining that the bit error rate once the user data has arrived at the fourth communication transmission system has exceeded a threshold.

20. A system for reducing latency when transmitting user data from a source communication transmission system to a destination communication transmission system across a chain of communication transmission systems, the system comprising:
- a receiver subsystem configured to receive wireless signals from a first communication transmission system in the chain of communication transmission systems;
- a transmitter subsystem configured to a second communication transmission system in the chain of communication transmission systems;
- control logic communicatively coupled to the receiver subsystem and transmitter subsystem that causes the receiver subsystem and the transmitter subsystem to operate in accordance with a particular signal processing mode;
- wherein operating in accordance with the particular signal processing mode causes the user data received by the receiver subsystem to bypass a first set of one or more processing modules in the receiver subsystem before being sent to the transmitter subsystem and further causes the user data to bypass a second set of one or more processing modules in a downstream transmitter before transmission to the second communication transmission system.

* * * * *